US007574243B2

(12) United States Patent
Lee

(10) Patent No.: US 7,574,243 B2
(45) Date of Patent: Aug. 11, 2009

(54) SLIDING MODULE OF SLIDING-TYPE PORTABLE TERMINAL

(75) Inventor: Sang-Min Lee, Suwon-si (KR)

(73) Assignee: Samsung Electronics Co., Ltd (KR)

( * ) Notice: Subject to any disclaimer, the term of this patent is extended or adjusted under 35 U.S.C. 154(b) by 638 days.

(21) Appl. No.: 11/128,913

(22) Filed: May 12, 2005

(65) Prior Publication Data

US 2006/0084303 A1 Apr. 20, 2006

(30) Foreign Application Priority Data

Oct. 18, 2004 (KR) ...................... 10-2004-0083005

(51) Int. Cl.
*H04M 1/00* (2006.01)

(52) U.S. Cl. ............. 455/575.4; 455/550.1; 379/433.12

(58) Field of Classification Search ............ 455/550.01, 455/575.1, 575.3, 575.4; 379/428.01, 433.01, 379/433.11, 433.12, 440
See application file for complete search history.

(56) References Cited

U.S. PATENT DOCUMENTS 6,822,871 B2 * 11/2004 Lee et al. .................... 361/727
2003/0064688 A1 * 4/2003 Mizuta et al. ................ 455/90
2003/0119544 A1 6/2003 Gventer
2004/0085739 A1 5/2004 Lee et al.
2004/0142719 A1 * 7/2004 Jung ...................... 455/550.1
2005/0001138 A1 * 1/2005 Wang et al. ................ 248/673
2005/0009581 A1 * 1/2005 Im et al. .................. 455/575.4

FOREIGN PATENT DOCUMENTS

EP 0 389 676 11/1989
KR 100453644 10/2004

* cited by examiner

*Primary Examiner*—Nhan T Le
(74) *Attorney, Agent, or Firm*—The Farrell Law Firm, LLP

(57) ABSTRACT

Disclosed herein is a sliding module of a sliding-type portable terminal which includes a sliding guide; a slider adapted to slide on the sliding guide; at least one guide rod extending along a longitudinal direction and coupled to the sliding guide, while being fixed to the slider, in such a manner that it can slide; and a guide rib extending along the longitudinal direction and interposed between the sliding guide and the guide rod. The sliding module has the guide rib positioned between the slider and the guide rod of the sliding guide so that many components, including the guide rod and dampers, are not exposed. Therefore, damage to and contamination of the sliding module is prevented. The aesthetic appearance of the terminal is improved by not exposing the components of the sliding module are not exposed to the exterior of the terminal.

11 Claims, 7 Drawing Sheets

SLIDING MODULE OF SLIDING-TYPE PORTABLE TERMINAL

PRIORITY

This application claims priority to an application entitled "Sliding Module of Sliding-type Portable Terminal" filed with the Korean Intellectual Property Office on Oct. 18, 2004 and assigned Ser. No. 2004-83005, the contents of which are incorporated herein by reference.

BACKGROUND OF THE INVENTION

1. Field of the Invention

The present invention relates to a portable terminal, and more particularly to a sliding-type portable terminal having a second housing adapted to slide along the longitudinal direction of a first housing to expose/hide a part of the first housing.

2. Description of the Related Art

In general, portable terminals may be classified into bar-type terminals, flip-type terminals, and folder-type terminals according to their appearance.

Bar-type terminals have a single body housing, on which data input/output means and transmitter/receiver units are positioned. However, bar-type terminals have a problem in that their keypad, which is used as the data input means, is always exposed and may operate erroneously. In addition, there exists a limitation in making the bar-type terminals in a compact size, because a minimum distance must be maintained between the transmitter and receiver units of the terminals.

Flip-type terminals have a body, a flip, and a hinge module for connecting the body with the flip. The body has data input/output means and transmitter/receiver units positioned thereon. The flip is adapted to cover the keypad, which is used as the data input means, to avoid erroneous operation thereof. However, there still exists a limitation in making flip-type terminals in a compact size, because the minimum distance must be maintained between the transmitter and receiver units of the terminals.

Folder-type terminals have a body, a folder, and a hinge module for connecting the body with the folder in such a manner that the folder can be rotated to open/close them. During a standby mode, the folder is folded on the body to avoid any erroneous operation of the keypad. During a speech mode, the folder is unfolded to secure a sufficient distance between the transmitter and receiver units. This is beneficial to making folder-type terminals in a compact size. For this reason, most recent portable terminals are configured as folder-type terminals.

When the flip or folder of flip-type or folder-type terminals is rotated a predetermined angle or more from the body, the hinge module which rotatably connects it to the body exerts a force in such a direction that it is automatically unfolded without any additional input of force from the user and, when it is rotated less than the predetermined angle, in such a direction that it is folded on the body.

As the design of portable terminals become diversified, sliding-type portable terminals having two housings, one of which is adapted to slide on the other to open/close them, have gradually commercialized.

U.S. Pat. No. 6,822,871, the contents of which are hereby incorporated by reference, discloses a portable terminal having a pair of housings coupled to each other in such a manner that they can slide and a sliding module thereof. In the disclosed portable terminal, one housing exposes/hides a part of the other housing, particularly a keypad, as it slides. A spring module is coupled to one housing and a rail-type sliding guide is coupled to the other housing to couple the pair of housings to each other in such a manner that they can slide.

However, the conventional sliding-type portable terminal and the spring module thereof have a problem in that, when a housing of the terminal has slid, components of the terminal, including the sliding guide, may be excessively exposed, making them subject to damage or contamination by alien substances, which degrade the smooth sliding of the housings of the terminal. In addition, components for guiding the sliding of the housings are directly exposed to the exterior and deteriorates the aesthetic appearance of the terminal.

SUMMARY OF THE INVENTION

Accordingly, the present invention has been made to solve the above-mentioned problems occurring in conventional systems, and an object of the present invention is to provide a sliding module of a sliding-type portable terminal having minimized exposure of the sliding module, when a housing of the terminal has slid, to prevent the sliding module from being damaged or contaminated by alien substances.

Another object of the present invention is to provide a sliding module of a sliding-type portable terminal adapted to conform to the contour of the terminal, even when exposed to the exterior, for improved design of the terminal.

In order to accomplish this object, there is provided a sliding module of a sliding-type portable terminal including a sliding guide; a slider adapted to slide on the sliding guide; at least one guide rod extending along a longitudinal direction and coupled to the sliding guide, while being fixed to the slider, in such a manner that it can slide; and a guide rib extending along the longitudinal direction and interposed between the sliding guide and the guide rod.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENTS

Hereinafter, preferred embodiments of the present invention will be described with reference to the accompanying drawings. In the following description of the present invention, a detailed description of known functions and configurations incorporated herein will be omitted to avoid making the subject matter of the present invention unclear.

Figure 1:
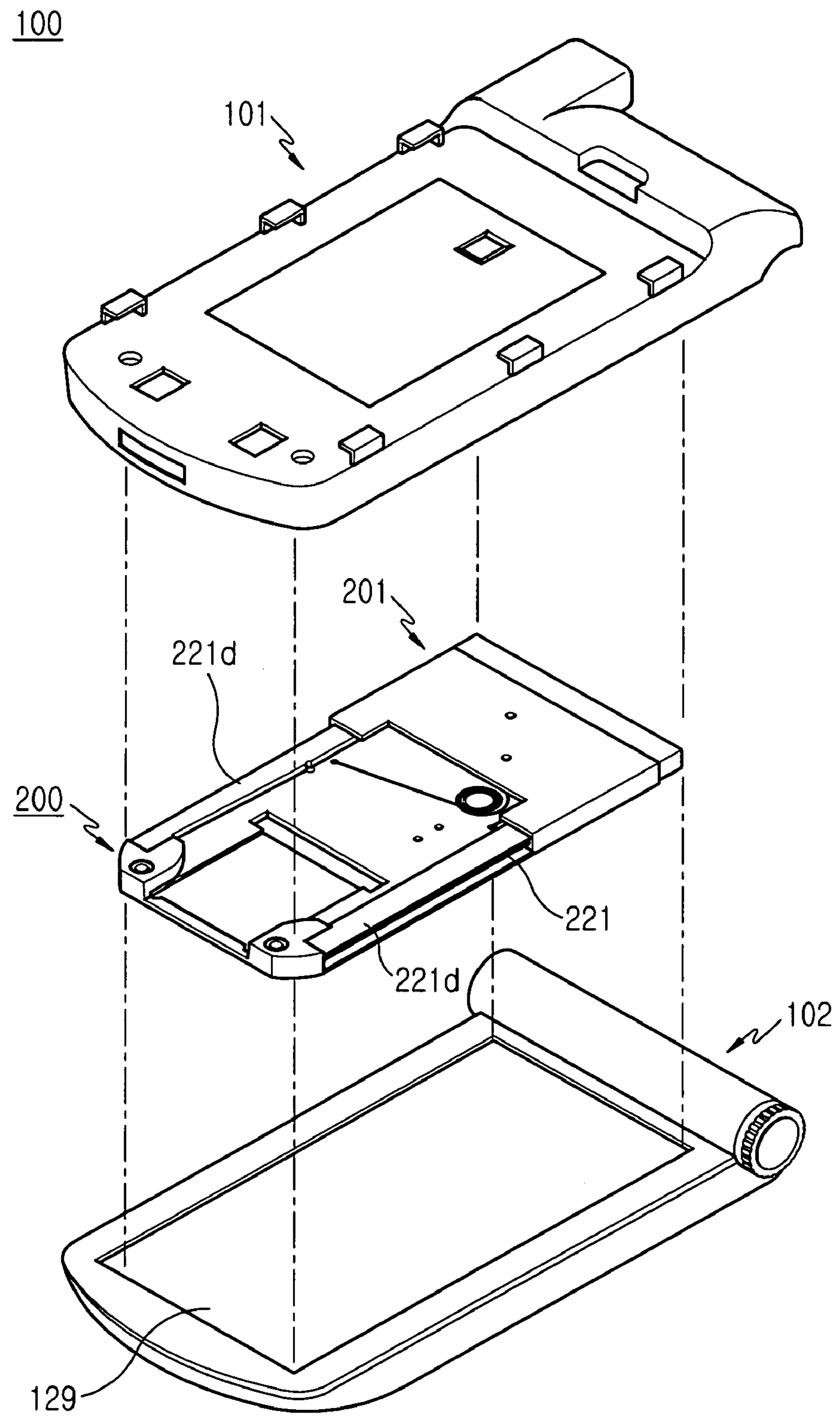
FIG. 1 is an exploded perspective view showing a sliding-type portable terminal equipped with a sliding module according to a preferred embodiment of the present invention.
Figure 2:
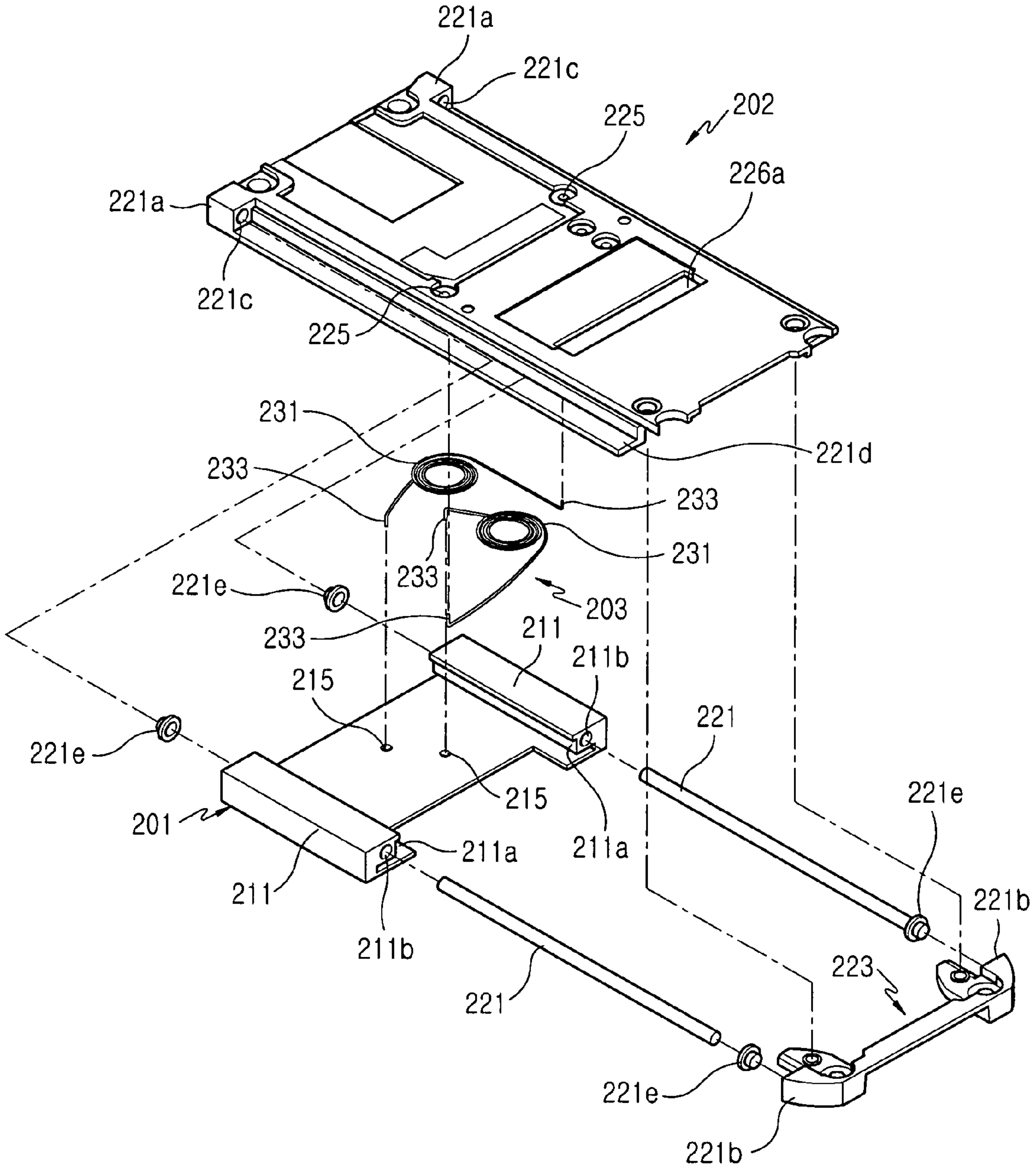
FIG. 2 is an exploded perspective view showing the sliding module of the portable terminal shown in FIG. 1.
Figure 3:
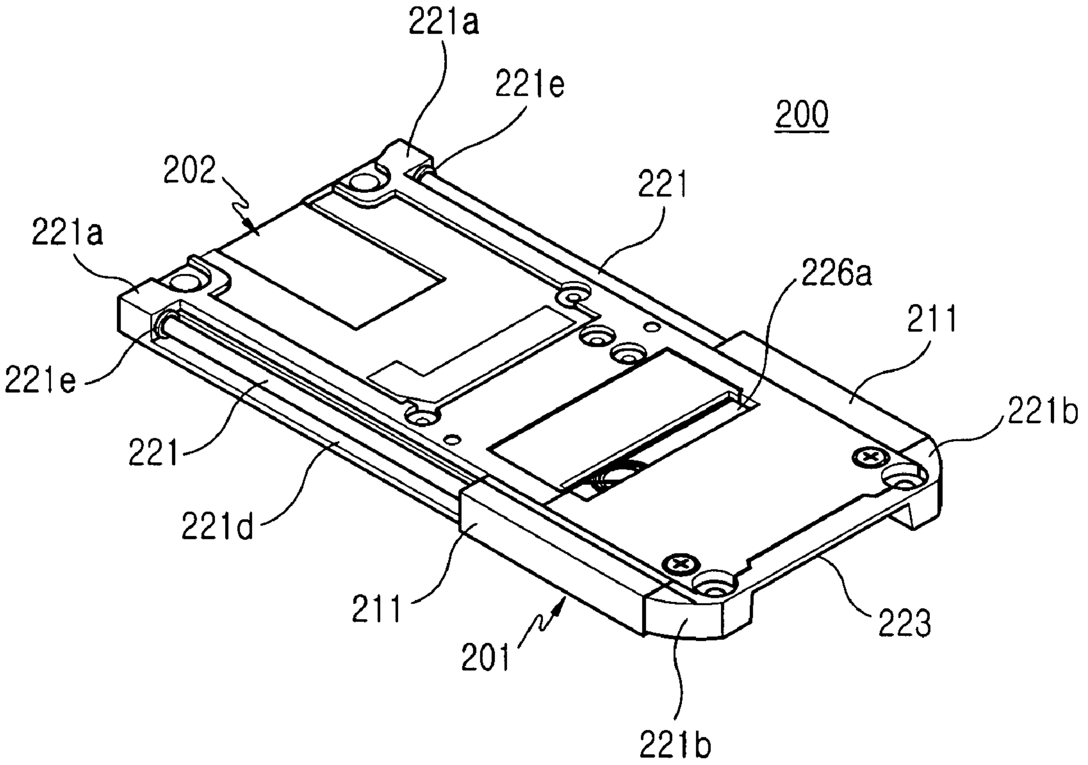
FIG. 3 is an assembled perspective view showing the sliding module shown in FIG. 2.

FIG. 1 is an exploded perspective view showing a sliding-type portable terminal 100 equipped with a sliding module 200 according to a preferred embodiment of the present invention, FIG. 2 is an exploded perspective view showing the sliding module 200 of the portable terminal shown 100 in FIG. 1, and FIG. 3 is an assembled perspective view showing the sliding module 200 shown in FIG. 2.

As shown in FIGS. 1 to 3, a sliding module 200 of a sliding-type portable terminal 100 according to a preferred embodiment of the present invention includes a sliding guide 201, a slider 202, and guide rod 221 and is coupled between a pair of housings 101 and 102 constituting the portable terminal 100. The sliding module 200 may be equipped with a torsion spring 203 to provide a force necessary for the sliding of the pair of housings 101 and 102.

The sliding guide 201 has a pair of sliding holders 211 extending along a longitudinal direction thereof, and laterally positioned on respective sides of a surface of the sliding guide 201, facing each other. Each sliding holder 211 has a guide groove 211*a* formed on the inner surface thereof along the longitudinal direction to engage with corresponding lateral ends of the slider 202 and a sliding hole 211*b* extending through the sliding guide along the longitudinal direction. The sliding guide 201 is fastened to a front surface of the first housing 101 of the sliding-type portable terminal.

Both lateral sides of the slider 202 are supported in the guide grooves 211*a* of the sliding guide 201 in such a manner that the slider 202 can slide. Specifically, guide ribs 221*d* extend from both lateral sides of the slider 202, respectively, and engage with the guide grooves 211*a* so that the slider 202 can slide. The slider 202 has a pair of guide rods 221 positioned on both lateral sides thereof, respectively, and an avoidance hole 226*a* extending through the upper and lower surfaces thereof. The avoidance hole 226*a* provides a path for a flexible printed circuit board (not shown), for connecting electric circuits of first and second housings. The guide rods 221 extend along the longitudinal direction and are inserted into the sliding holes 211*b* of the sliding guide 201 in such a manner that they can slide with both ends thereof fixedly coupled to the slider 202. Consequently, the slider 202 is adapted to slide along the longitudinal direction while supported by the guide grooves 211*a* and the sliding holes 211*b* of the sliding guide 201.

The guide rods 221 are fixed in a position spaced above a surface of the guide ribs 221*d*. Specifically, the guide rods 221 are positioned on the guide ribs 221*d* and preferably do not protrude from the lateral ends of the slider 202. When the guide ribs 221*d* are integral with the slider 202, the interrelationship among the sliding guide 201, the slider 202, and the guide rods 221 is as follows: the guide rods 221 are positioned on the slider 202, particularly spaced above a surface of the guide ribs 221*d*, and the sliding guide 201 surrounds the guide ribs 221*d* while being positioned on the other surface of the slider 202 and is coupled to the guide rods 221*d* in such a manner that it can slide. Consequently, the guide ribs 221*d* are interposed between the guide rods 221 and the sliding guide 201.

The slider 202 is provided with support ribs 221*a* and 221*b* to couple the guide rods 221 thereto. The support ribs 221*a* and 221*b* includes a pair of first support ribs 221*a* extending from both lateral surfaces of an end of the slider 202 in respective lateral directions, and a pair of second support ribs 221*b* formed on a fixation piece 223, which is coupled to an other end of the slider 202. The fixation piece 223 is coupled to the other end of the slider 202 by various fixing means, including screws and welding, so that the second support ribs 221*b* extend in respective lateral directions of the slider 202. Therefore, the first and second support ribs 221*a* and 221*b* face each other on respective lateral portions of the slider 202. Each of the support ribs 221*a* and 221*b* has a fixation hole 221*c* formed thereon to be coupled to an end of guide rod 221.

As the sliding holders 211 of the sliding guide 201 are positioned between the support ribs 221*a* and 221*b* of the slider 202, the support ribs 221*a* and 221*b* act as a stopper of the sliding holders 211 to limit the range of movement of the slider 202. The support ribs 221*a* and 221*b* may have a damper 221*e* of elastic material, such as silicon rubber, positioned on the inner surface thereof to dampen the impact and noise generated when the sliding holders 211 collide with the support ribs 221*a* and 221*b*. The dampers 221*e* are preferably fixed to the fixation holes 221*c* while being coupled to both ends of the guide rods 221, respectively.

Figure 4:
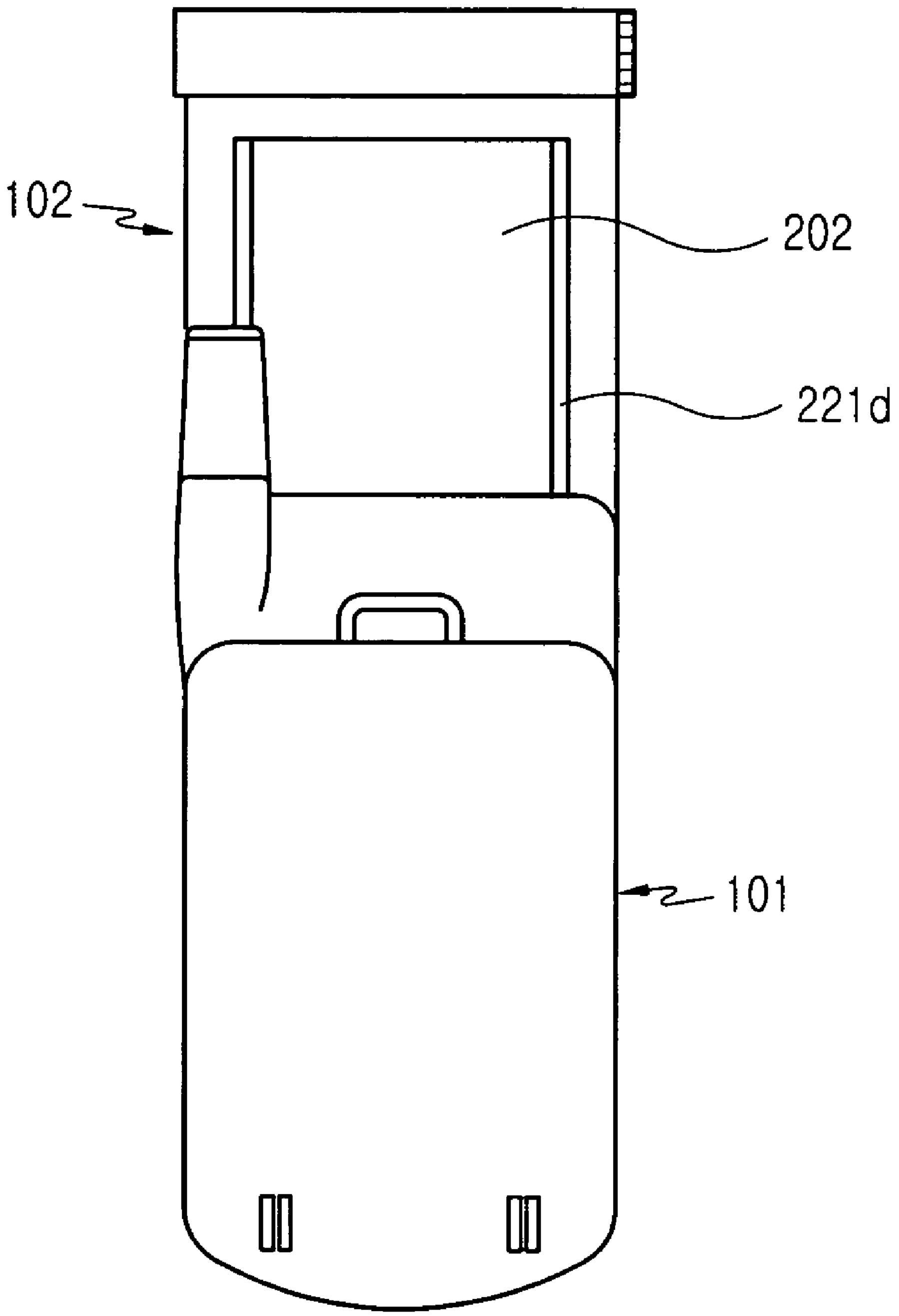
FIG. 4 is a rear view showing the portable terminal shown in FIG. 1 after its second housing has slid away from its first housing.

The slider 202 is fastened to the rear surface of the second housing 102 of the sliding-type portable terminal 100 and is positioned in such a manner that it faces the sliding guide 201. Referring to FIG. 4, the guide rods 221 are covered by the guide ribs 221*d* and are not exposed to the exterior, even when the second housing 102 of the portable terminal 100 equipped with the sliding module 200 has slid away from the first housing 101.

The torsion spring 203 has a coil portion 231 for generating an elastic force and a pair of free ends 233 extending from the coil portion 231. The coil portion 231 provides an elastic force in such a direction that the free ends 233 move away from each other. The sliding guide 201 and the slider 202 have torsion spring fixation holes 215 and 225 formed thereon, respectively, to couple the free ends 233 of respective torsion springs 203 thereto. When the free ends 233 are coupled to the torsion spring fixation holes 215 and 225 of the sliding guide 201 and the slider 202, respectively, the torsion spring 203 is interposed between the sliding guide 201 and the slider 202.

Although a pair of torsion springs 203 are provided in the present invention, any number of torsion springs 203 may be used, as desired.

The torsion spring 203 provides an elastic force in such a direction that the free ends 233 thereof move away from each other. Therefore, the elastic force from the torsion spring 203 is exerted in a direction to cause any one of the support ribs 221*a* or 221*b* to contact the sliding guide 201. At such contacting position, the elastic force accumulated in the torsion spring 203 is minimized.

As the slider 202 slides on the sliding guide 201, the free ends 233 of the torsion spring 203 move toward or away from each other. The elastic force from the torsion spring 203 acts as a driving force which moves the sliding guide 201 in either a first or a second longitudinal direction with reference to the closest position between the free ends 233. Providing that the sliding guide 201 moves up and down along the vertical, i.e. longitudinal, direction of the terminal, the first and second directions may be defined as the upward and downward directions, respectively, as referenced in the following description of the opening/closing operation of the portable terminal 100.

Figure 5:
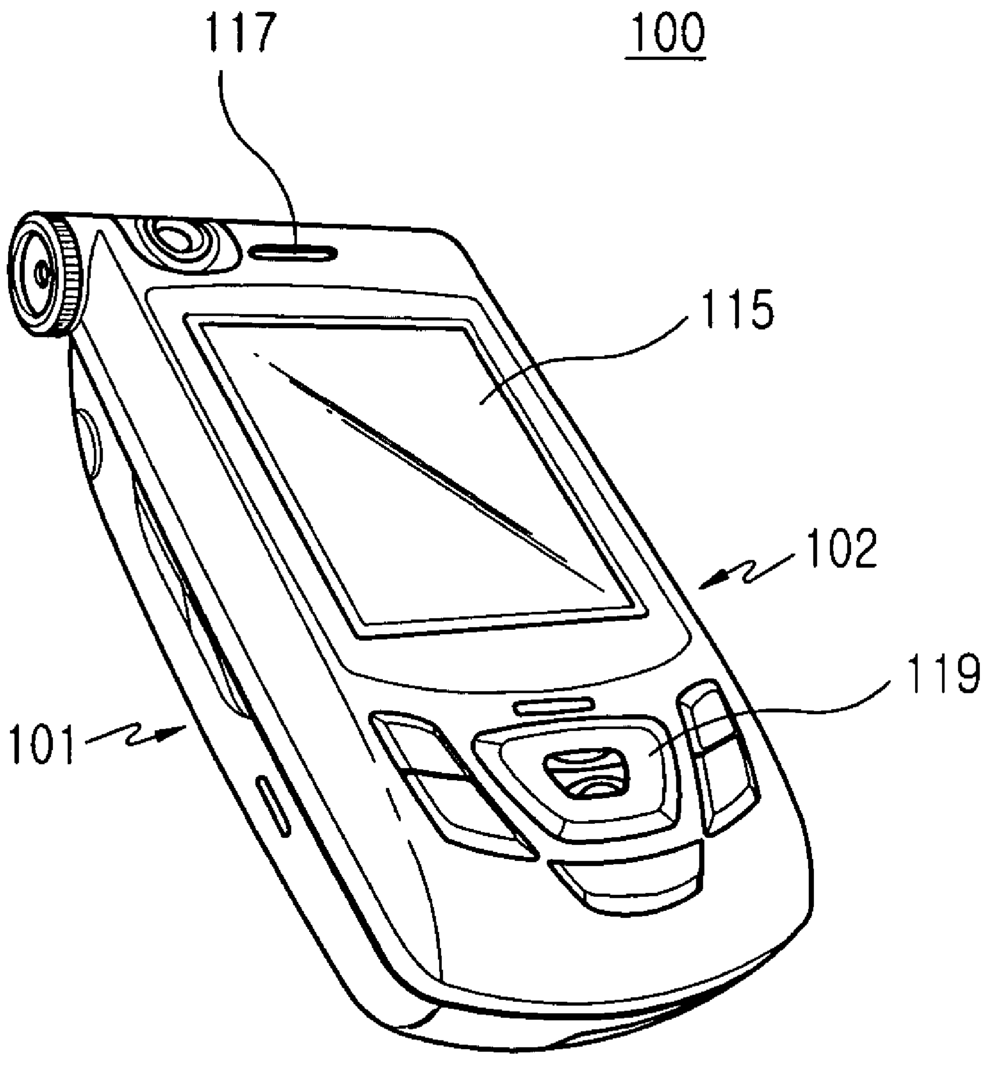
FIGS. 5 to 7 illustrate the opening/closing operation of the portable terminal shown in FIG. 1.
Figure 6:
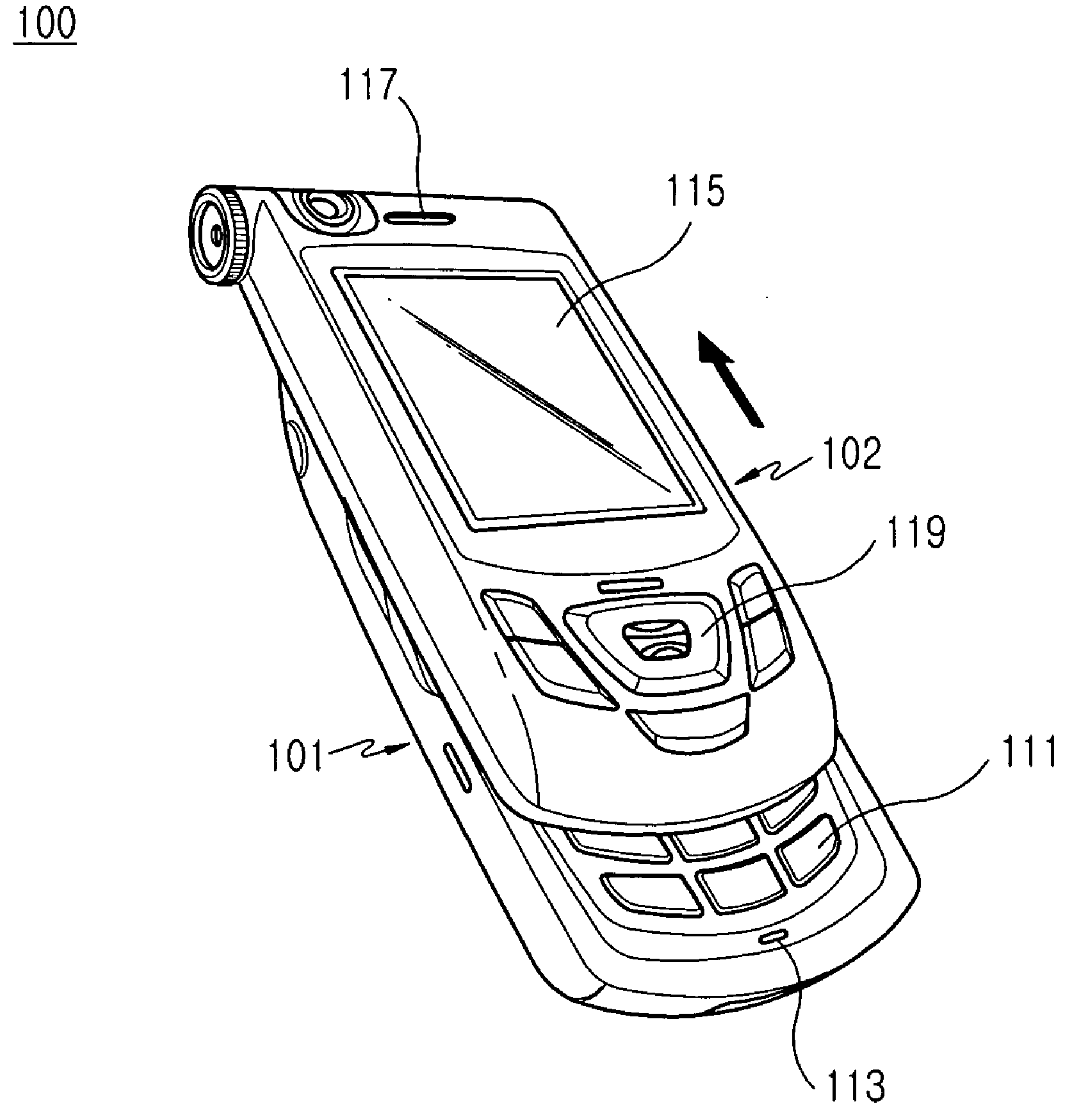
Figure 7:
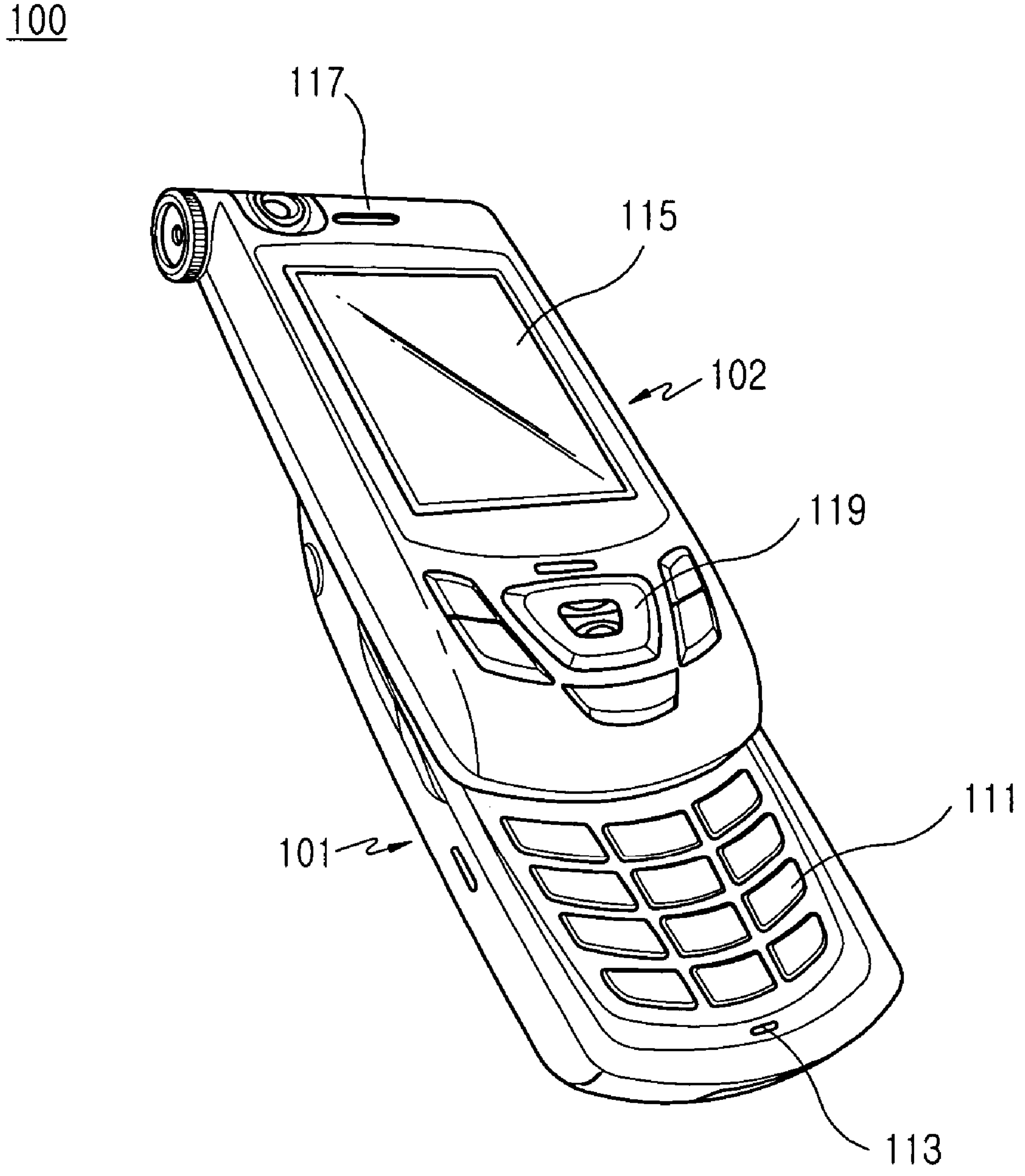

FIGS. 5 to 7 illustrate the opening/closing operation of the portable terminal 100 shown in FIG. 1. The portable terminal 100 has a keypad 111 and a microphone unit 113, which are positioned on the front surface of the first housing 101, as well as a display device 115, a speaker unit 117, and a function key 119, which are positioned on the front surface of the second housing 102. The keypad 111 and the microphone unit 113 are exposed/hidden as the second housing 102 slides.

FIG. 5 shows a standby mode wherein the second housing 102 is slid on the first housing 101 and covers the keypad 111 and the microphone unit 113. In this state, the first support ribs 221*a* on the upper side of the sliding module 200 contact the sliding guide 201.

FIG. 6 shows a state wherein the user has partially moved the second housing 102 in the upward direction away from the first housing 101. The torsion spring 203 accumulates an elastic force as the free ends 233 thereof approach each other. The elastic force is accumulated in the torsion spring 203 as the second housing 102 is moved downward and the free ends 233 of the torsion spring 203 are positioned closest to each other.

As the second housing 102 is moved further upward, the free ends 233 of the torsion spring 203 goes past the closest position, the elastic force from the torsion spring 203 acts a driving force to move the second housing 102 upward. The second housing 102 is then moved to the upper side of the first housing 101, as shown in FIG. 7, to completely expose the keypad 111 and the microphone unit 113.

Consequently, the sliding module 200 provides a driving force which moves the second housing 102 in either the first or second, i.e. upward or downward longitudinal, direction, depending on the relative positions of the second housings 101 and 102. When the user wants to expose the keypad 111 and the microphone unit 113, he has only to slide the second housing 102 along a part of a region of travel in the upward direction. The second housing 102 is then slid by the elastic force from the torsion spring 203 for the remaining part of the region of travel in the upward direction, to define a predetermined region. This makes the terminal convenient to use.

Components including the guide rods 221 and the dampers 221*e* are covered by the guide ribs 221*d* and are not exposed to the exterior, even when the second housing 102 has completely moved in the upward direction away from the first housing 101.

As mentioned above, the sliding module of a sliding-type portable terminal according to the present invention has the guide ribs positioned between the slider and the guide rods of the sliding guide so that many components, including the guide rods and the dampers, are not exposed to the exterior. Therefore, the sliding module is prevented from being damaged by external factors. Contamination by alien substances is also prevented, and the portable terminal has a more pleasing aesthetic appearance because the components thereof are not exposed to the exterior of the terminal.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A sliding module of a sliding-type portable terminal, comprising:

a sliding guide;

a slider adapted to slide on the sliding guide between a closed position and an open position;

at least one guide rod extending along a longitudinal direction, fixed to the slider and slidingly coupled to the sliding guide; and a guide rib extending along the longitudinal direction and interposed between the sliding guide and the guide rod, wherein the at least one guide rod is hidden by the guide rib from the exterior in the open position.

2. The sliding module of a sliding-type portable terminal as claimed in claim 1, wherein a pair of guide rods are fixed to both lateral sides of the slider, respectively.

3. The sliding module of a sliding-type portable terminal as claimed in claim 1, wherein the guide rib is integral with the slider.

4. The sliding module of a sliding-type portable terminal as claimed in claim 1, wherein the sliding guide is positioned on a surface of the slider, the guide rib is formed on each of both lateral sides of the slider, and the slider is adapted to slide while being surrounded by the sliding guide.

5. The sliding module of a sliding-type portable terminal as claimed in claim 1, further comprising a sliding hole extending through the sliding guide along the longitudinal direction so that the guide rod can be coupled thereto while being able to slide.

6. The sliding module of a sliding-type portable terminal as claimed in claim 1, further comprising a torsion spring having a free end fixed to the sliding guide and an other free end fixed to the slider, and wherein the torsion spring is interposed between the sliding guide and the slider and is adapted to provide a sliding force, in a predetermined region, to move the slider in a first direction and an other sliding force, outside the predetermined region, which moves the slider in an opposite direction to the first direction.

7. The sliding module of a sliding-type portable terminal as claimed in claim 1, wherein the guide rod has dampers of elastic material coupled to both ends thereof, respectively.

8. A sliding-type portable terminal having first and second housings and a sliding module interposed therebetween to slidingly couple the first and second housings, the sliding module comprising:

a sliding guide coupled to a front surface of the first housing;

a slider coupled to a rear surface of the second housing and adapted to slide on the sliding guide between a closed position and an open position;

at least one guide rod extending along a longitudinal direction, fixed to the slider and slidingly coupled to the sliding guide; and a guide rib extending along the longitudinal direction and interposed between the sliding guide and the guide rod, wherein the at least one guide rod is hidden by the guide rib from the exterior in the open position.

9. The sliding-type portable terminal as claimed in claim 8, wherein the guide rib is integral with the slider and conforms to the contour of the second housing.

10. The sliding-type portable terminal as claimed in claim 8, wherein the guide rod is positioned between the guide rib and the rear surface of the second housing.

11. A method for slidingly coupling first and second housing of a sliding-type portable terminal, comprising:

coupling a sliding guide to a front surface of the first housing;

coupling a slider to a rear surface of the second housing, the slider sliding on the sliding guide between a closed position and an open position;

adapting the slider to slide on the sliding guide in a longitudinal direction;

extending at least one guide rod along the longitudinal direction, fixing the guide rod to the slider, and slidingly coupling the guide rod to the sliding guide; and extending a guide rib along the longitudinal direction, between the sliding guide and guide rod, wherein the at least one guide rod is hidden by the guide rib from the exterior in the open position.

* * * * *